Jan. 12, 1926.  1,569,168

K. S. BAXTER ET AL

AUTOMOBILE CAB

Filed August 3, 1925   2 Sheets-Sheet 1

Inventors:
Kenneth S. Baxter
By Charles H. Cannon
Gillson, Mann & Cox,
Att'ys.

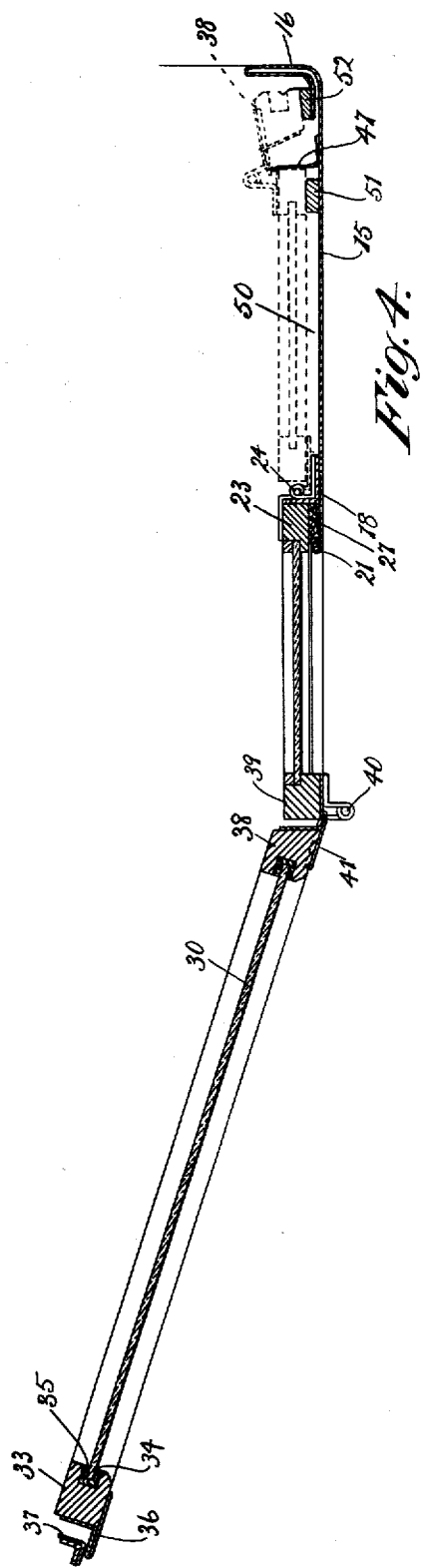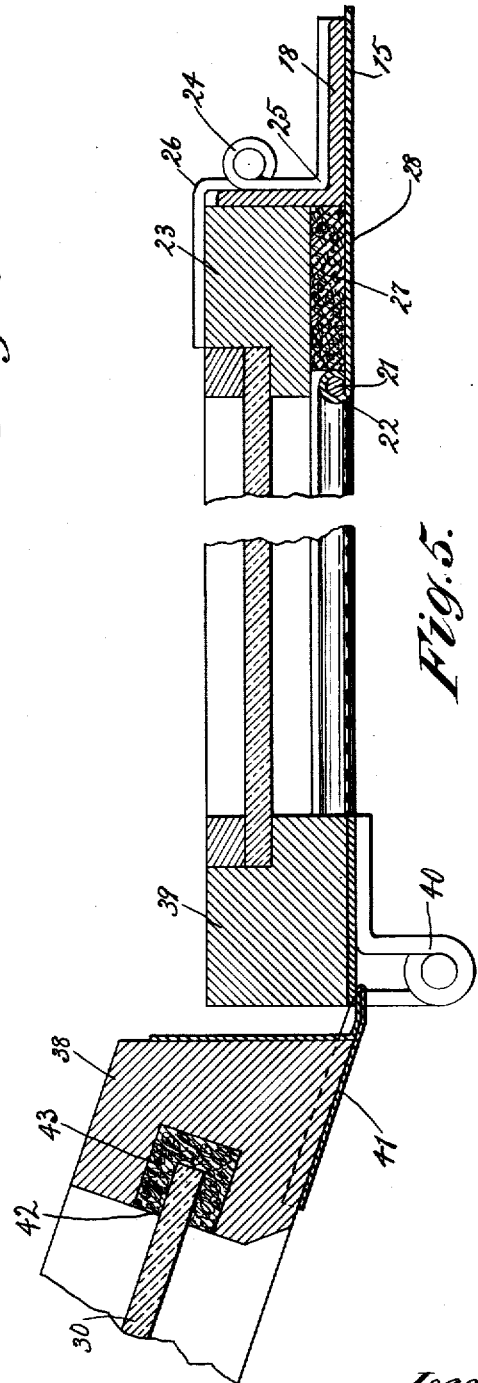

Patented Jan. 12, 1926.

1,569,168

UNITED STATES PATENT OFFICE.

KENNETH S. BAXTER AND CHARLES H. CANNON, OF MICHIGAN CITY, INDIANA, ASSIGNORS TO SHEET METAL PRODUCTS COMPANY, OF MICHIGAN CITY, INDIANA, A CORPORATION OF INDIANA.

AUTOMOBILE CAB.

Application filed August 3, 1925. Serial No. 47,684.

*To all whom it may concern:*

Be it known that we, KENNETH S. BAXTER and CHARLES H. CANNON, citizens of the United States, and residents of Michigan City, county of La Porte, and State of Indiana, have invented certain new and useful Improvements in Automobile Cabs, of which the following is a specification, and which are illustrated in the accompanying drawings, forming a part thereof.

This invention relates to automobile cabs and has for its principal object to provide a cab that can be closed tightly or opened either partially or widely in an easy and convenient manner. Further objects and advantages of the invention will become apparent as the disclosure proceeds and the description is read in connection with the accompanying drawings in which Fig. 1 is an elevation of the left side of the cab in a closed condition;

Fig. 4 is a horizontal section through the left side of the cab, taken on the line 4—4 of Fig. 1, and Fig. 5 is an enlarged fragment of Fig. 4.

Figure 1:
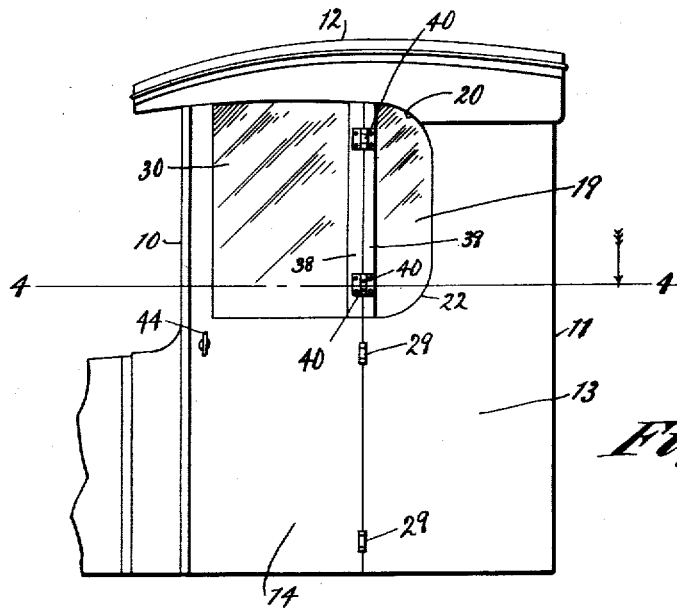

The cab is composed of a front 10, including a suitable transparent wind shield, a back 11, a top 12 and two sides composed of side panels 13 and side doors 14. The panels 13 are composed principally of sheet metal plates 15 (Fig. 4) wrapped around corner angles 16 and 17 (Fig. 3) and stiffened by an intermediate angle 18 (Figs. 4 and 5). The angles 16, 17 and 18, each have one flange parallel with the length of the automobile and one flange transverse thereto. The upper portion of the side panel 13 is cut away at the front to provide a window opening 19. The upper and lower portions of the opening are rounded, as indicated at 20, and the edge of the metal plate 15 is rolled around a wire 21 (Fig. 5) to form a bead 22.

The window opening is fitted with a window sash 23 mounted on the stiffening angle 18 by hinges 24, the straps of which are bent, as indicated at 25 and 26, to permit the sash to assume the solid line position shown in Figs. 4 and 5, or the dotted line position shown in Fig. 4, as occasion may require.

The edge 28 of the plate 15 (Fig. 5) is equipped with a felt cushion 27 adapted to contact with the rear portion of the sash 23, and prevent rattling.

The door 14 is mounted on the angle 17 and the front edge of the plate 15 by hinges 29. This door only extends up to the bottom of the window opening 19, but it is provided with a slidably mounted glass 30 adapted to be raised and lowered by the chain and sprocket mechanism 31 under the control of the crank 32. At the forward edge of the door is provided with an upright guide 33 grooved on its rear side, as indicated at 34, and lined with felt, or the like, 35, to make a quiet seat for the front edge of the glass 30. The guide is also equipped with an angular edge piece 36 to make a tight joint with the corner angle 37 (Fig. 4) of the front of the cab.

The rear edge of the glass 30 is guided and stiffened by a rear guide 38 mounted on the front upright 39 of the sash 23 by hinges 40, the axes of which are aligned with the hinges 29 so as to permit the guide 38 to swing with the door in opening and closing. The guide 38 is equipped at its rear edge with an angular plate 41 to make a tight joint with the upright 39 of the sash. The front edge of the guide is grooved at 42 and lined with felt, or the like, 43, to receive the rear edge of the glass 30. At its front edge the door is equipped with a handle 44 controlling a latch by which it is secured in closed position.

On its inside at the upper edge the door 14 is equipped with a bolt 45 for securing the guide 38 to the door when it is desired to have them swing together. The panel 13 and the top 12 are equipped with bolts 46 to engage the forward edge of the sash 23 and secure it in closed position. The panel 13 is also provided with a spring latch 47 (Fig. 4) for latching the sash in its open position, shown in dotted lines in Fig. 4.

Figures 2, 3:
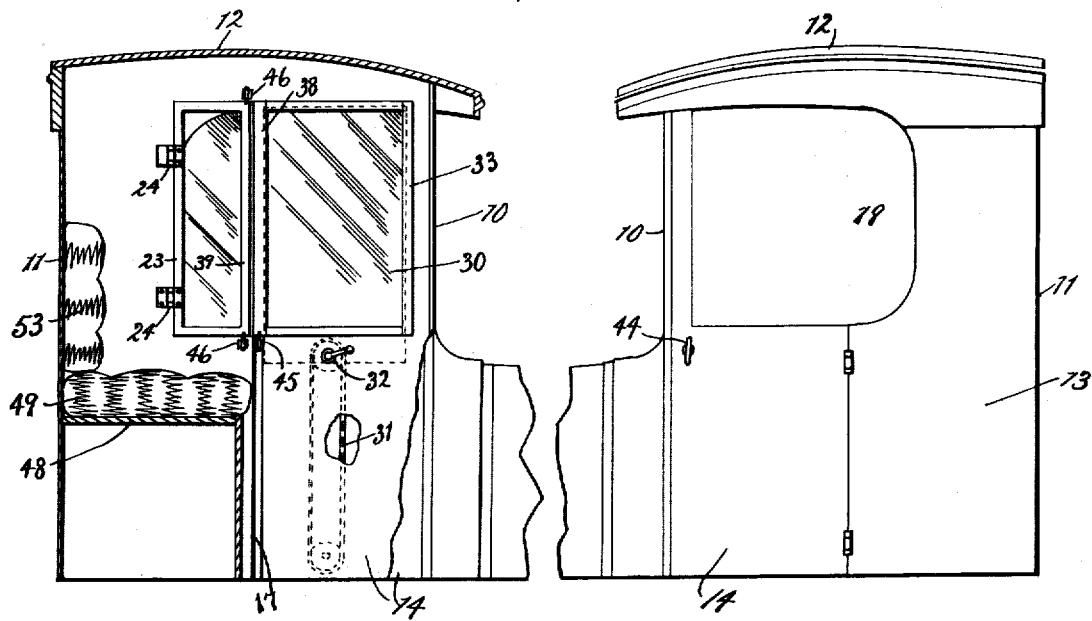
Fig. 2 is a similar view of the cab in an open condition.
Fig. 3 is a longitudinal sectional view showing the left side of the cab from the inside.

The rear of the cab is provided with a seat 48 equipped with a cushion 49, and a back rest 53 (Fig. 3).

Figs. 1, 3 and 4 show how a cab construction, as above described may be entirely closed when it is desired to protect the driver from the weather. With parts in this condition the door 14 may be opened and closed in the ordinary manner under the control of the handle 44, the glass 30 being supported in raised position by the chain and sprocket mechanism 31 and being sustained against lateral movement by the guides 33 and 38. The guide 38 is securely locked to the door by the bolt 45 and when the latter is opened the guide swings on the hinges 40.

When it is desired to partially open the cab the crank 32 may be operated to lower the glass 30 either partially or wholly according to the desires of the driver. When further opening is desired the bolts 45 and 46 are withdrawn and the sash 23, with the guide 39, is swung to the position indicated by dotted lines in Fig. 4. With the parts in this relation the cab presents the open appearance shown in Fig. 2.

The transversely arranged flanges of the angles 18 and 16 form a pocket 50 (Fig. 4) which amply accommodates the sash 23 and the guide 38 when in open position. The spring latch 47 holds them in this position and a suitable padding 51 and 52 can be provided to prevent rattling.

The sash and the guide 38 are always readily available when it is desired to close the cab. For example, in case of a sudden shower the spring latch 47 may be withdrawn, the sash and guide swung to closed position and locked by the bolts 45 and 46, the glass 30 may then be raised by the crank 32, and the cab is entirely closed.

In prior cab construction intended to permit the cab to be entirely closed or the upper portion to be opened wide at the sides, it has been found necessary either to make the back rest too low for comfort, or the fixed part of the side too high to permit the driver to mount at the side of the steering column. This invention avoids these objections and also permits the upper parts of the sides to be readily opened and closed.

We claim as our invention:

1. In an automobile cab, the combination of a side wall having a door opening, a door hinged at its rear edge to the side wall adjacent to said opening, a glass slidably mounted in said door, a guide for the glass projecting above the door at its forward edge, a window opening to the rear of the door opening, a window sash hinged at its rear edge to the side wall to swing between a position folded against the side wall and a position closing the window opening, and a guide for the rear edge of the door glass hinged to the front edge of the window sash.

2. In an automobile cab, the combination of a side panel having a window opening extending rearwardly from the forward edge of the upper portion thereof, a window sash hinged at its rear edge to swing between a position against the inner side of said panel and a position closing said window opening, a door hinged to the side panel below the window opening, a glass slidably mounted in the door, a front guide for the glass extending upwardly from the forward edge of the door and a guide hinged to the window sash in line with the hinges of the door.

3. In an automobile cab, the combination of a seat, a side panel having a window opening extending rearwardly from its forward edge above the seat, a stiffening angle extending along the rear edge of said opening and having one flange directed inwardly, a window sash hinged to said stiffening angle, a door hinged to the side panel below the window opening, a glass mounted to slide from a position within the door to a position projecting above the door, a grooved guide for the glass projecting above the door at its forward edge and a grooved guide hinged to the window sash in line with the hinges of the door.

4. In an automobile cab, the combination of a seat, a side panel having a window opening extending rearwardly from the forward edge of the upper portion thereof and a pocket on its inner side in the rear of said opening, a window sash hinged to the panel to swing between said pocket and said window opening, a door hinged to the side panel below the window opening, a glass slidably mounted in the door, a front guide for the glass extending upwardly from the forward edge of the door and a rear guide hinged to the window sash in line with the hinges of the door.

In testimony whereof we affix our signatures.

KENNETH S. BAXTER.
CHARLES H. CANNON.

Certificate of Correction.

It is hereby certified that the name of the assignee in Letters Patent No. 1,569,168, granted January 12, 1926, upon the application of Kenneth S. Baxter and Charles H. Cannon, of Michigan City, Indiana, for an improvement in "Automobile Cabs," was erroneously described and specified as "Sheet Metal Products Company," whereas said name should have been described and specified as *Sheet Steel Products Company*, as shown by the records of assignments in this office; and that the said Letters Patent should be read with this correction therein that the same may conform to the record of the case in the Patent Office.

Signed and sealed this 9th day of February, A. D. 1926.

[SEAL.]
WM. A. KINNAN,
*Acting Commissioner of Patents.* and closed in the ordinary manner under the control of the handle 44, the glass 30 being supported in raised position by the chain and sprocket mechanism 31 and being sustained against lateral movement by the guides 33 and 38. The guide 38 is securely locked to the door by the bolt 45 and when the latter is opened the guide swings on the hinges 40.

When it is desired to partially open the cab the crank 32 may be operated to lower the glass 30 either partially or wholly according to the desires of the driver. When further opening is desired the bolts 45 and 46 are withdrawn and the sash 23, with the guide 39, is swung to the position indicated by dotted lines in Fig. 4. With the parts in this relation the cab presents the open appearance shown in Fig. 2.

The transversely arranged flanges of the angles 18 and 16 form a pocket 50 (Fig. 4) which amply accommodates the sash 23 and the guide 38 when in open position. The spring latch 47 holds them in this position and a suitable padding 51 and 52 can be provided to prevent rattling.

The sash and the guide 38 are always readily available when it is desired to close the cab. For example, in case of a sudden shower the spring latch 47 may be withdrawn, the sash and guide swung to closed position and locked by the bolts 45 and 46, the glass 30 may then be raised by the crank 32, and the cab is entirely closed.

In prior cab construction intended to permit the cab to be entirely closed or the upper portion to be opened wide at the sides, it has been found necessary either to make the back rest too low for comfort, or the fixed part of the side too high to permit the driver to mount at the side of the steering column. This invention avoids these objections and also permits the upper parts of the sides to be readily opened and closed.

We claim as our invention:

1. In an automobile cab, the combination of a side wall having a door opening, a door hinged at its rear edge to the side wall adjacent to said opening, a glass slidably mounted in said door, a guide for the glass projecting above the door at its forward edge, a window opening to the rear of the door opening, a window sash hinged at its rear edge to the side wall to swing between a position folded against the side wall and a position closing the window opening, and a guide for the rear edge of the door glass hinged to the front edge of the window sash.

2. In an automobile cab, the combination of a side panel having a window opening extending rearwardly from the forward edge of the upper portion thereof, a window sash hinged at its rear edge to swing between a position against the inner side of said panel and a position closing said window opening, a door hinged to the side panel below the window opening, a glass slidably mounted in the door, a front guide for the glass extending upwardly from the forward edge of the door and a guide hinged to the window sash in line with the hinges of the door.

3. In an automobile cab, the combination of a seat, a side panel having a window opening extending rearwardly from its forward edge above the seat, a stiffening angle extending along the rear edge of said opening and having one flange directed inwardly, a window sash hinged to said stiffening angle, a door hinged to the side panel below the window opening, a glass mounted to slide from a position within the door to a position projecting above the door, a grooved guide for the glass projecting above the door at its forward edge and a grooved guide hinged to the window sash in line with the hinges of the door.

4. In an automobile cab, the combination of a seat, a side panel having a window opening extending rearwardly from the forward edge of the upper portion thereof and a pocket on its inner side in the rear of said opening, a window sash hinged to the panel to swing between said pocket and said window opening, a door hinged to the side panel below the window opening, a glass slidably mounted in the door, a front guide for the glass extending upwardly from the forward edge of the door and a rear guide hinged to the window sash in line with the hinges of the door.

In testimony whereof we affix our signatures.

KENNETH S. BAXTER.
CHARLES H. CANNON.

Certificate of Correction.

It is hereby certified that the name of the assignee in Letters Patent No. 1,569,168, granted January 12, 1926, upon the application of Kenneth S. Baxter and Charles H. Cannon, of Michigan City, Indiana, for an improvement in "Automobile Cabs," was erroneously described and specified as "Sheet Metal Products Company," whereas said name should have been described and specified as *Sheet Steel Products Company*, as shown by the records of assignments in this office; and that the said Letters Patent should be read with this correction therein that the same may conform to the record of the case in the Patent Office.

Signed and sealed this 9th day of February, A. D. 1926.

[SEAL.]
WM. A. KINNAN,
*Acting Commissioner of Patents.*